Feb. 25, 1930.  D. H. FRENCH  1,748,925
JOURNAL BEARING
Filed May 28, 1926   2 Sheets-Sheet 1
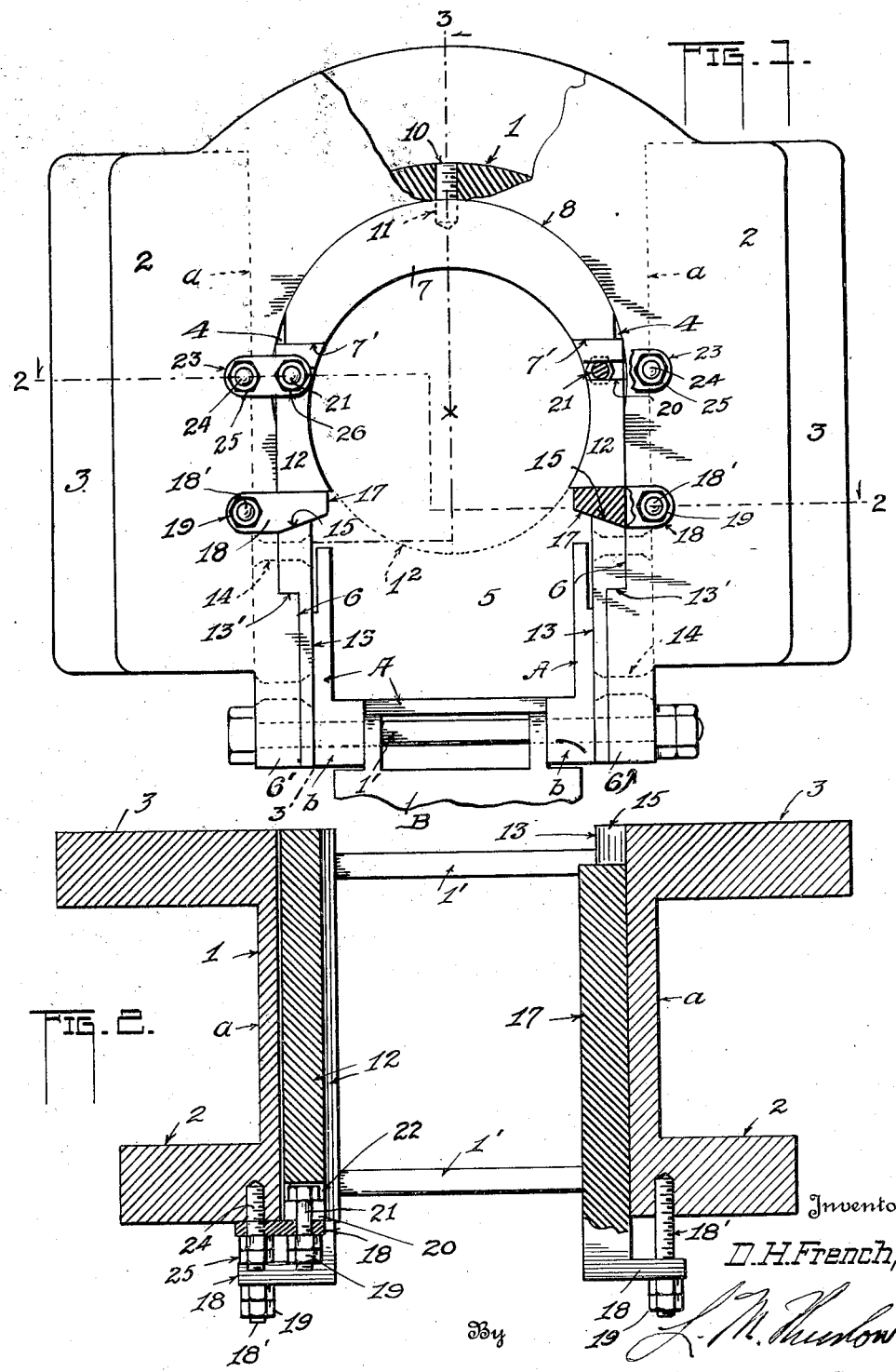

Feb. 25, 1930.  D. H. FRENCH  1,748,925
JOURNAL BEARING
Filed May 28, 1926   2 Sheets-Sheet 2
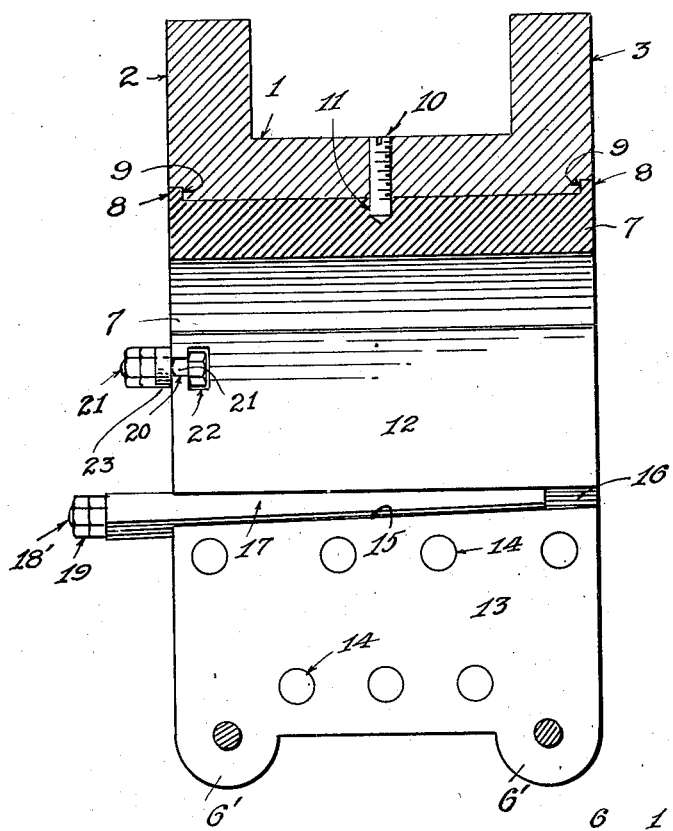
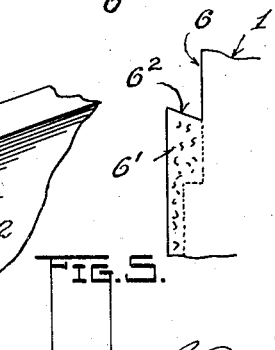
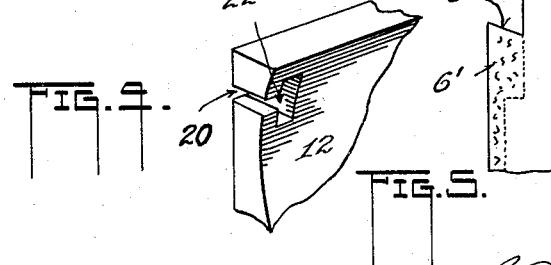
Inventor
D. H. French,
By L. M. Thurlow
Attorney Patented Feb. 25, 1930

1,748,925

UNITED STATES PATENT OFFICE

DELBERT H. FRENCH, OF OAK PARK, ILLINOIS, ASSIGNOR TO JULIUS Q. GILL, OF PEORIA, ILLINOIS

JOURNAL BEARING

Application filed May 28, 1926. Serial No. 112,221.

This invention relates to journal bearings more particularly of the type known as locomotive driving boxes but which while particularly applicable as such may be used with other axles of rolling stock.

An object of the invention is to provide a structure in a journal bearing of the type named whereby a driving box already in use may be reconstructed to adapt it for receiving certain parts and permitting adjustment thereof for taking up wear.

A further and important object is to provide a structure by which a driving box of common type already in use, or a box that may have been discarded may be reconstructed and placed in service with adjustments for taking up wear and made as efficient as a newly constructed box.

Still another object is that of providing in a locomotive driving box a structure by which the said box will not be subject to distortion, a spacing part being interposed between the extensions thereof as a preventive measure.

Besides these objects the invention includes certain novel structural features and arrangement of parts to be brought out herein aided by the accompanying drawings wherein:

Figure 1 is a front elevation of a journal bearing constructed according to my invention.

Figure 2 is a horizontal section of the bearing on line 2—2 of Figure 1.

Figure 3 is a vertical transverse section of the bearing on line 3—3, Figure 1.

Figure 4 is part of a "quarter piece" shown in perspective, and

Figure 5 is a front elevation of part of the journal bearing showing an extension of one of its walls similar to Figure 1.

The numeral 1 designates a common driving box or such as is now used which has the customary flanges, an outer and an inner, 2 and 3 respectively to engage at opposite sides of the locomotive-frame or pedestal, not shown, and provided with the usual arched cavity 4 communicating with which is a vertically extending opening 5 the walls 6 of which are substantially parallel and drop vertically from positions at the widest part of such arch, the portions having such walls terminating in ears 6' to receive bolts 1', the space between the bolts and the locomotive driving axle 1², indicated in broken lines, receiving the usual oil or grease cellar A the specific placing of which, in this instance, will receive attention later herein.

A "crown piece" 7, usually of brass, and of arcuate form lies up in the arched cavity 4 and may be flanged at each end as 8 in the usual way to seat in recesses 9 preventing end play of such crown-piece, or a screw or pin 10 may be carried in the top of the box and depend into a recess 11 in said crown-piece as a common method, or both expedients may be employed as shown.

The lower edges 7' of the crown-piece terminate well above a line passing horizontally through the center of the said axle 1² so that said crown-piece may freely drop from its seat in the arch and as freely be replaced.

Railroads today are rapidly making use of improved journal boxes but due to the cost of special new forms of boxes it is becoming necessary to make use of the old forms or those now in use by reconstructing them and this I have found to be possible by the methods and means herein to be described, the structures so far touched upon being those in more or less common use.

So-called "quarter-pieces" or "quarter-brasses" denoted at 12, which as such are old, are herein provided. One of these lies beneath each edge 7' of the crown-piece 7.

Since the faces 6 of the common type of box to be reconstructed usually drop substantially from points at the widest part of the arch 4, there being no projections upon which to support the quarter-pieces named, some form of supporting means for the latter must be provided as well as to provide for taking up wear on the said crown-piece 7. To accomplish this I may employ either of two methods. That is to say, as shown in Figure 1 I may provide a plate 13 which I term a "filler-block" to fit against each wall 6 of the box and secure it in place by rivets 14, for example, and preferably the walls 6 and the plate are shouldered at 13' to provide a further support with the said rivets, though this may not be resorted to. As illustrated, the plates 13 are thicker at the top than at the lower portion. Preferably the wall surfaces and the meeting surfaces of the filler-blocks are machined whereby to provide a neat and close fit. The upper edge of each filler-block 13 is beveled downwardly and inwardly toward the wall 6 as at 15, and such bevel is spaced from the quarter-piece 12 which lies above it. Again, said filler-block 13, Figure 3, is made with an upwardly inclined edge slightly off of horizontal extending from the outer to the inner end thereof providing a wedge-shaped recess 16 between it and the lower edge of the quarter-piece 12 to receive a wedge 17 of corresponding form, the latter by reason of the bevel 15 and the lengthwise inclined edge of the filler-block 13 causing the wedge to be held in position and causing it, when forced upward, to carry the quarter-piece against the crown-piece. The addition of the extra metal of plate 13 makes the width of the surface 15 greater than the width of the corresponding shoulder on the upper edge of the wall 6 prior to the addition of the extra metal. Thus the wedge 17 has a broader foundation on which to rest than was provided before the extra metal was added.

The second and preferred method is that of adding metal to the wall 6 by one of the welding methods now well known such, for example, as electric or oxy-acetylene welding, creating a built-up portion as shown in Figure 5 at $6^2$ to provide a ledge corresponding to 15 of Figure 1, the bevel and the inclined surface lengthwise being provided as before.

The said wedge 17 has a right angled extension 18 provided with an aperture, not shown, to permit passage of a threaded stud 18' therethrough fixed in the box 1, nuts 19 engaging the stud serving to assist in forcing said wedge into the recess 16 as occasion requires, and for fixing the wedge in any position placed. Longitudinal movement of the quarter-pieces 12 may be prevented by any suitable means but preferably in each at its end at the outer side of the box is a slot 20 parallel to the base of the latter and adapted to receive a bolt 21 whose head lies within an enlargement 22 of said slot, the bolt being slidable in the T-shaped recess thus provided. A plate 23 is secured at one end upon the face of the box 1 through the use of a stud 24 fixed in the latter and nuts 25, the said bolt 21 extending through its other end and receiving thereon nuts 26. By this arrangement the quarter-piece 12 may be adjusted vertically by the wedges 17 after loosening the nuts 25 and 26, the bolt sliding in the said T-shaped recess in such adjustment but preventing longitudinal movement of said quarter-piece with respect to the crown-piece.

Wear on the quarter-pieces may be taken up by the insertion of suitable shims, not shown, between them and the box in a customary way.

It is clear that by extending the walls 6 toward one another by building them up by either method above described, but preferably by welding as stated, or both riveting and welding, a box that is otherwise usable may be reconstructed to include the adjustable features desired at the present time, and at a comparatively low cost, or at least as compared with new equipment that might be provided. In this way boxes that have been discarded may be readily utilized at a great saving of expense. The structure provided admits of adjusting the parts for wear and at the same time the withdrawal of the wedges 17 permits the quarter-pieces and crown-piece to be readily dropped out as occasion arises.

Relative to the welding method it may be stated that this provides a better union of the metals and in fact making the parts integral providing for an unyielding support for the wedges 17 whereas if riveting were used alone the members 13 would become loosened due to the extremely heavy strains imposed upon the rivets, the latter becoming stretched permitting such loosening.

Experience has shown that driving boxes of the type described as commonly used are subject to distortion on becoming heated so that an unequal expansion of the unit results. This is to say, when heated due to friction the tendency of the depending portions of which the ears 6' are parts is to approach one another so that the parallel vertical faces $a\ a$, Figures 1 and 2, which should have a smooth sliding fit between the inner parallel faces of the engine frame or pedestal referred to earlier herein, but not shown, are thrown out of line causing looseness and ill fitting and resulting in faster wear. Under such conditions it is then required that the box be removed from the pedestal and machined to restore parallelism of its said faces $a\ a$, besides to provide means for taking up the resultant space due to such machining. Heretofore no means has been provided for preventing the occurrence mentioned, the usual oil or grease cellar being an independent part inserted loosely in place after the box has been installed, said cellar merely serving in its capacity as a lubricant receptacle. One of my purposes herein is to prevent distortion of the whole box by snugly fitting between the extensions of the box below the axle $1^2$ a spacing part which may be a special part or it may be the cellar A itself whose opposite sides where they bear upon the extensions may be machined, and also machining the faces of the said extensions whereby an exact fit is obtained. In the present instance the bolts 1' may pass through extensions $b$ of the cellar if desired. With a true fit the cellar or other part properly spaces the extensions and the bolts maintain the assembly besides functioning to prevent spreading of the latter. This arrangement or an equivalent thereof I deem of much importance in view of the difficulties heretofore existing. Any usual closure B, of course, having ears to engage the bolt 1' may be provided.

Claims directed to the method of reconstructing locomotive driving journal boxes to produce the product of the present invention are embodied in my copending application Serial No. 220,351, filed September 19, 1927, Method of reconstructing locomotive driving journal boxes.

I claim:

1. A locomotive driving box having opposite side walls, a separate shoulder on each side wall and positioned opposite to each other and extending therefrom in the direction of one another, and a filler block lying against each wall and resting upon the said shoulder thereof and extending downwardly over the edge of each shoulder into the space between said shoulders in the direction of one another and each welded to its respective side wall.

2. A locomotive driving box having opposite side walls, a separate shoulder on each side wall and positioned opposite to each other and extending therefrom into the space between said side walls, each shoulder constituting a support, and a filler block positioned upon each shoulder and extending downwardly over the edge of the same and between the said shoulders and welded to the wall from which the shoulder extends.

3. The combination of a locomotive driving box of the arched type and its journal, said box having opposite side walls within the arched opening thereof and spaced apart a distance substantially equal to the greatest width of said arch, said journal being positioned in said arch, each wall having a separate shoulder and said shoulders extending in the direction of each other and lying below the lowermost portion of said journal, and a filler-block abutting upon each wall and resting upon said shoulder thereof and extending downwardly over the edge of said shoulder and secured to said wall and providing a supporting surface facing upwardly into said arch.

4. A locomotive driving box of the arched type having opposite side walls within the arched opening thereof and spaced apart a distance approximately that of the width of the arch, a portion of each wall extending centrally toward the opposite wall and including a shoulder extending substantially laterally and facing the top of the arch and constituting a support, a filler-block resting upon said shoulder of each wall and extending downwardly over the edge of the same and secured against the wall at points above and below said shoulder and having an upwardly facing supporting surface.

5. A locomotive driving box including opposite walls spaced apart a distance substantially that of the width of the arch, each wall including a shoulder projecting from that wall and having an upper surface facing the top of the arch and constituting a support, and a separate filler-block welded to each wall and engaging the shoulder thereof and extending over the edge and downwardly between said shoulders and having an upwardly facing supporting surface.

6. In a locomotive driving box of the arched type, oppositely spaced walls facing each other and spaced apart a distance substantially that of the greatest width of the arch, a projecting member on each wall and each member extending in the direction of the other and each including a shoulder surface facing the top of the arch and constituting a support, a separate filler-block resting upon each projecting member and extending downwardly over the edge thereof and between said shoulders of said opposite walls and each welded to its adjacent side wall, each filler-block having a top supporting surface, a crown member seated in the top of the arch to receive a journal and at each opposite edge of said crown member a separate quarter member beneath and supporting the crown member, and beneath each quarter member a separate wedge lying between each quarter member and the next adjacent one of the said filler blocks.

7. A journal bearing including in its construction a box having a recess extending up into it from its lower side, a crown-piece, a quarter-piece beneath the crown-piece, means to adjust the quarter-piece in the direction of the crown-piece, said quarter-piece having a T-shaped slot in its end extending at right angles to its direction of adjustment, a plate overlying the slot and part of the box, means to secure the plate to the latter, a member extending through the plate and slidably engaging the quarter-piece within the slot, and means to secure the quarter-piece and plate relatively.

8. A journal bearing including in its construction a box having a recess extending up into it from its lower side, a crown-piece seated in said recess, a quarter-piece beneath each end of the crown-piece, a plate extending across part of the box and said quarter-piece, means to secure the plate relative to the box, said plate and said quarter-piece being adjustable relatively to each other, and means to secure said plate and quarter-piece in adjustable relation relatively to each other.

9. A journal bearing including in its construction a box having a recess extending up into it from its lower side, a crown-piece seated in said recess, a quarter-piece beneath each end of the crown-piece, a plate extending across part of the box and said quarter-piece, means to secure the plate with respect to the box, and means to adjustably secure the said plate with respect to said quarter-piece and to permit adjustments of the latter with respect to said plate.

10. A journal bearing including in its construction a box having a recess extending up into it from its lower side, a crown-piece seated in the recess, a quarter-piece beneath each end of the crown-piece adapted to be moved toward and engage the same, a plate extending across part of the box and said quarter-piece and shiftable with respect to both, means to secure the plate relatively to the box, and means to secure the plate and quarter-piece relatively, both said means adapted to permit the plate to shift with respect to both, to said box and said quarter-piece.

11. In a journal box, opposite spaced side walls rigidly positioned with respect to each other and having upper and lateral bearing elements for the reception of a rotatable shaft, and initial supporting means comprising oppositely faced ledges one each in the material of each side wall and faced upwardly, and direct supporting means for holding said bearing element comprising spaced elements, one each mounted face to face against said spaced opposite walls and each having a shoulder facing downwardly and resting on and fitting complementary to said ledge with a portion extending downwardly over the same, and each of said direct supporting elements extending over and being firmly secured at a location above its said shoulder to the upright surface of its next adjacent side wall, and each direct supporting element having an upper edge surface for the mounting of bearings or wedges therefor.

12. In a journal box, opposite spaced side walls rigidly positioned with respect to each other and having upper and lateral bearing elements for the reception of a rotatable shaft, and initial supporting means comprising oppositely faced ledges one each in the material of each side wall and faced upwardly, and direct supporting means for holding said bearing element comprising spaced elements, one each mounted face to face against said spaced opposite walls and each having a shoulder facing downwardly and resting on and fitting complementary to said ledge with a portion extending downwardly over the same, and each of said direct supporting elements extending over and being welded at a location above its said shoulder to the upright surface of its next adjacent side wall, and each direct supporting element having an upper edge surface for the mounting of bearings or wedges therefor, the width of the upper edge surface of each of said direct supporting elements being greater than the width of said shoulders in the respective side walls.

13. A filler block for building up the inner walls of locomotive driving boxes comprising a metal element having one side portion thicker than the other side portion, and the faces of both side portions being substantially flat, there being a step between the thin portion and the thick portion, and said element being larger at one end than at the other and gradually tapering therebetween.

14. A filler block for building up the inner walls of locomotive driving boxes comprising a metal element having one side portion thicker than the other side portion, and the faces of both side portions being substantially flat, there being a step between the thin portion and the thick portion, said opposite faces being parallel to each other, and said element being larger at one end than at the other and gradually tapering therebetween.

15. A filler block for supplementing the thickness of the walls of a journal box, which block comprises a metal element having a thick portion at one side and a thin portion at the opposite side and having a step extending in a straight line across said block at the juncture of the thin and thick portions, and the upper marginal edge surface of the thick portion extending in a plane diagonally transverse to the opposite surfaces of said block and lengthwise of said step inclined transversely thereto.

16. A locomotive driving box having opposite side walls, a separate shoulder on each side wall and positioned opposite to each other and extending therefrom in the direction of one another, and a filler block lying against each wall and resting upon the said shoulder thereof and extending downwardly over the edge of each shoulder into the space between said shoulders in the direction of one another and each welded to its respective wall, that portion of each filler block lying above said shoulder being higher at one end than at the other providing an upper face inclined to the horizontal from end to end.

17. A locomotive driving box having opposite side walls, a separate shoulder on each side wall and positioned opposite to each other and extending therefrom into the space between said side walls, each shoulder constituting a support, and a filler block positioned upon each shoulder and extending downwardly over the edge of the same and between the said shoulders and welded to the wall from which the shoulder extends, that portion of each filler block lying above said shoulder being higher at one end than at the other providing an upper face inclined to the horizontal from end to end.

18. In a locomotive driving box of the arched type, oppositely spaced walls facing each other and spaced apart a distance substantially that of the greatest width of the arch, a projecting member on each wall and each member extending in the direction of the other and each including a shoulder surface facing the top of the arch and constituting a support, a separate filler-block resting upon each projecting member and extending downwardly over the edge thereof and between said shoulders of said opposite walls and each welded to its adjacent side wall, each filler-block having a top supporting surface inclined to the horizontal from end to end of said block, a crown member seated in the top of the arch to receive a journal and at each opposite edge of said crown member a separate quarter member beneath and supporting the crown member, and beneath each quarter member a separate wedge lying between each quarter member and the next adjacent one of the said filler-blocks.

19. A locomotive driving box having opposite side walls, a separate shoulder on each side wall and positioned opposite to each other and extending therefrom in the direction of one another, and a filler-block lying against each wall and resting upon the said shoulder thereof and each welded to its respective side wall.

20. A locomotive driving box having opposite side walls, a separate shoulder on each side wall and positioned opposite to each other and extending therefrom in the direction of one another, and a filler block lying against each wall and resting upon the said shoulder thereof and each welded to its respective wall, each filler-block being higher at one end than at the other providing an upper face inclined to the horizontal from end to end.

21. In a locomotive driving box of the arched type, oppositely spaced walls facing each other and spaced apart a distance substantially that of the greatest width of the arch, a projecting member on each wall and each member extending in the direction of the other and each including a shoulder surface facing the top of the arch and constituting a support, a separate filler-block resting upon each projecting member and each welded to its adjacent side wall, each filler-block having a top supporting surface inclined to the horizontal from end to end of said block, a crown member seated in the top of the arch to receive a journal and at each opposite edge of said crown member a separate quarter member beneath and supporting the crown member, and beneath each quarter member a separate wedge lying between each quarter member and the next adjacent one of the said filler-blocks.

In testimony whereof I affix my signature.

DELBERT H. FRENCH.